No. 730,489. PATENTED JUNE 9, 1903.
M. H. SULLIVAN.
ROTARY ENGINE.
APPLICATION FILED NOV. 6, 1902.
NO MODEL. 6 SHEETS—SHEET 1.

Witnesses
Inventor
M. H. Sullivan

No. 730,489. PATENTED JUNE 9, 1903.
M. H. SULLIVAN.
ROTARY ENGINE.
APPLICATION FILED NOV. 6, 1902.
NO MODEL. 6 SHEETS—SHEET 3.

Witnesses
Inventor
M. H. Sullivan
By
Attorneys

No. 730,489. PATENTED JUNE 9, 1903.
M. H. SULLIVAN.
ROTARY ENGINE.
APPLICATION FILED NOV. 6, 1902.
NO MODEL. 6 SHEETS—SHEET 4.

Witnesses
Inventor
M. H. Sullivan
By
Attorneys No. 730,489. PATENTED JUNE 9, 1903.
M. H. SULLIVAN.
ROTARY ENGINE.
APPLICATION FILED NOV. 6, 1902.
NO MODEL. 6 SHEETS—SHEET 5.

Inventor
M. H. Sullivan

No. 730,489. Patented June 9, 1903.

UNITED STATES PATENT OFFICE.

MICHAEL H. SULLIVAN, OF POUGHKEEPSIE, NEW YORK, ASSIGNOR OF ONE-THIRD TO CONRAD C. GINDRA, OF POUGHKEEPSIE, NEW YORK.

ROTARY ENGINE.

SPECIFICATION forming part of Letters Patent No. 730,489, dated June 9, 1903.

Application filed November 6, 1902. Serial No. 130,312. (No model.)

*To all whom it may concern:*

Be it known that I, MICHAEL H. SULLIVAN, a citizen of the United States, residing in Poughkeepsie, in the county of Dutchess and State of New York, have invented a new and useful Rotary Engine, of which the following is a specification.

This invention is an improvement in rotary engines, and relates especially to that type of engine shown and described in my application for United States Letters Patent filed March 10, 1902, Serial No. 97,616, on which this is an improvement.

My object is to provide a durable highly-efficient reversible motor of the three-piston type in which both the force of the impact and compression of the live steam and the force of the expanding steam is fully utilized after the supply is temporarily cut off.

Another object of my invention is to provide a device in which the expanding fluid, which is usually wasted, may be again utilized as a driving power, and a further object is to provide an automatic feed and cut-off, all of which being so arranged and operated that the device may be quickly stopped or reversed.

With these briefly-stated objects in view my invention consists in providing a casing having a toothed disk revolubly mounted therein, in which is supported a series of sliding pistons, which are pushed back and forth through the wheel by the irregular bearing-surfaces of the casing, so that the force of the expanding steam will be quickly and effectively utilized throughout the entire movement of each piston and after the steam has been so used to conduct it to a chamber where it is used upon the toothed peripheral surface of the wheel before it finally escapes.

In the accompanying drawings, Fig. 6ª is a detail perspective view of the opposite or inner side of one of the inner sections. Fig. 17 is an enlarged detail section of one of the valve-casings, showing the general arrangement of the valves and ports. Fig. 18 is a face view of one of the pistons, parts being broken away. Fig. 19 is a plan view of the same.

In carrying out my invention I employ a casing A, composed of the two sections $A'$ $A'$, each comprising the hub-sections $A^2$, irregular side walls or ends $A^3$, the peripheral portions $A^4$, and the annular flange $A^5$, through the latter of which bolts $a$ pass, that securely fasten the said sections together, and which when thus united form a complete cylinder A, with a central annular chamber $A^6$, formed by the space inclosed by the flanges. The casing is supported by suitable legs $A^7$.

A shaft B is revolubly journaled within the hubs of the casing, projecting on each side, and a toothed disk C is rigidly mounted on the shaft within the casing. A plurality of slots, preferably three in number, are formed in the disk, each having a piston D slidably retained therein, whose ends are adapted to bear against the inner surface of the irregular walls of each section $A'$ and by which the pistons are moved back and forth through the wheel. The irregular surface of the walls of each section are arranged diagonally opposite each other, so that when the sections are united the inner points $a'$ of one section will be arranged opposite the extreme outer points $a^2$ of the opposite section, and as the points $a'$ of each section abut against the disk C it will be seen that I provide a series of four separate and distinct chambers E, in which the pistons operate.

The hub-sections $A^2$ have a grooved cam-track $a^3$, in which travel rollers carried by the pistons, as will be hereinafter more fully explained.

Upon opposite sides of the casing and arranged at right angles to each other are the steam-chests F, each being composed of the inner section $F'$ and the outer section $F^2$, said inner section having ports $ff$ arranged therein that communicate with ports $a^4 a^4$ in the casing and which form the inlet-ports to the chambers E. The ports $f$ being arranged at angles to each other intersect, and at the point of intersection I arrange a controlling plug-valve G, having a main port $G'$ and two auxiliary ports $g\ g$, that communicate with the main port G, so that in starting the engine the auxiliary ports will first let a sufficient quantity of steam pass into the casing and against the pistons before the main ports register with the ports $ff$, which avoids the sudden jar incident to any engine when the main port is suddenly opened.

The valves G have their stems $G^2$ projecting through sleeves $G^3$, which are screwed into the inner section $F'$ and have their outer ends protected by a suitable cap $G^4$, which encircles the said stem and forms, together with the sleeves $G^3$, a suitable packing-box, which prevents the escape of steam. The extreme outer ends of the valve-stems are provided with crank-levers $g'$, which are connected, by means of links $g^2$, to a controlling hand-lever H, suitably mounted upon the casing and locked in the desired position by means of a lever $H'$ engaging a rack-segment $H^2$.

A rotary valve I is mounted in a seat in the inner section $F'$ of each of the valve-chambers and each valve comprising the inner disk or valve proper, $I'$, in which is arranged ports $i$, and the shafts or stems $I^2$, upon the outer end of each of which is mounted a mutilated pinion $I^3$, meshing with a mutilated gear J, carried by the main drive-shaft B. A disk $I^4$ is arranged upon each shaft and bears upon the inner surface of a chamber $F^3$, formed upon the outer section $F^2$ of the respective steam-chests, the said disk having a tapering hub or collar operating in a sleeve K, which is screwed into the wall of the chest $F^3$ and has its outer end covered by a cap $K'$. By arranging the mutilated surface upon the pinions and gears a temporary stop or retardation of the valve is permitted when the ports register, so that sufficient quantity of steam is admitted into each steam-chest each time the ports in the valves register with the ports in the inner section $F'$.

The driving-gear J is preferably constructed in two sections $J'\ J^2$ to facilitate manufacture, the said sections being firmly bolted together to form a complete wheel, one section, $J^2$, having a portion of its teeth cut out at three equidistant points, whereby an intermittent movement is given to the driven wheel $I^3$, which latter is also mutilated at one point on the edge opposite the mutilated edge of the driving-pinion J for the purpose of insuring a perfect stop. It may be stated here that each of the three toothed sections of the pinion J has the same number of teeth as the pinion $I^3$, so that as the said pinions are revolved each valve is caused to register with its respective port, but just after one of the three pistons pass the inlet-port, and, further, by arranging the number of teeth in the gears and pinions as specified the ports will be opened at each third revolution of the shaft or as each piston passes said inlet-ports.

The pistons, three in number, comprise a body portion D, a recessed portion $D'$ at each end, in which is slidably retained a cap $D^2$, carrying a pin projecting into a longitudinal recess $D^3$, the pin bearing against a helical spring $D^4$, (see Fig. 18,) tending to slide the cap away from the body portion and yieldingly permitting it to be seated entirely within the recess $D'$, its outer face being flush with the ends of the piston.

Transverse recesses $D^5$ are formed on each side of the piston adjacent the ends, and in the bottom of these recesses are seated helical springs $D^6$, bearing at their outer ends roller $D^7$, which are adapted to travel in the grooves $a^3\ a^5$, respectively.

The springs $D^4$ normally force the caps out and press them firmly against the bearing-surfaces of the casings.

The slots $C'$ of the wheel C are reinforced by suitable boxing $C^4$, having recesses from which project spring-actuated rollers $C^5$, which serve to prevent leakage around the sides of the slots $C'$ and serve as bearings for the piston D to slide on, reducing friction and permitting a more rapid movement of the pistons through the wheel.

Figure 1:
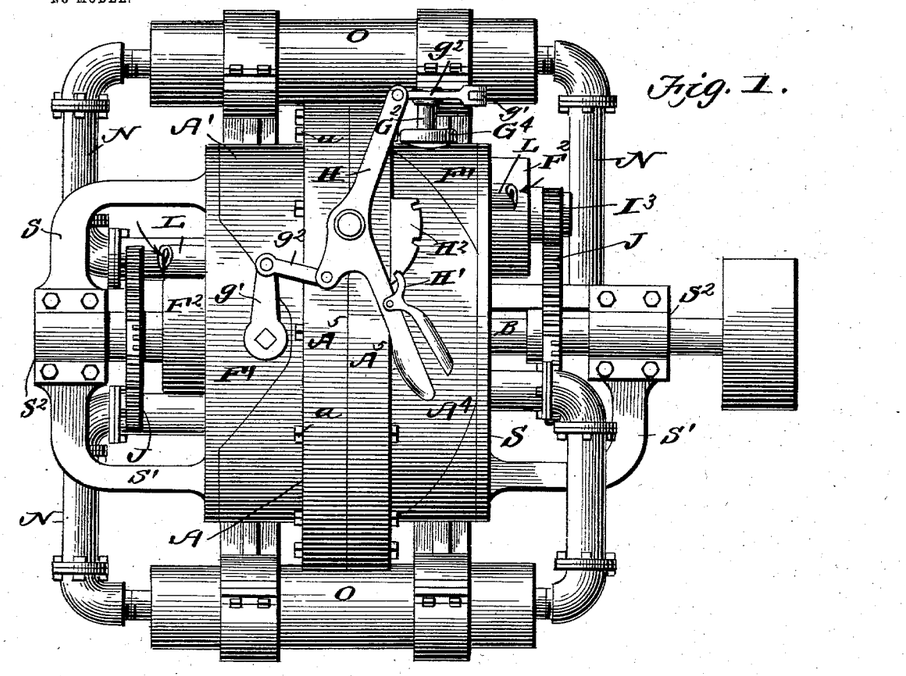
Figure 1 is a plan view of my improved rotary engine.
Figure 2:
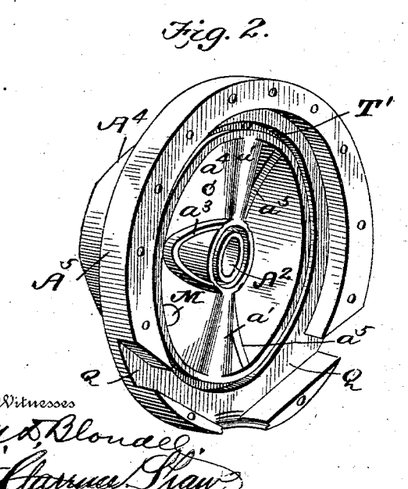
Figs. 2 and 3 are detail perspective views of the abutting faces of the sections that form the case when bolted together.
Figure 3:
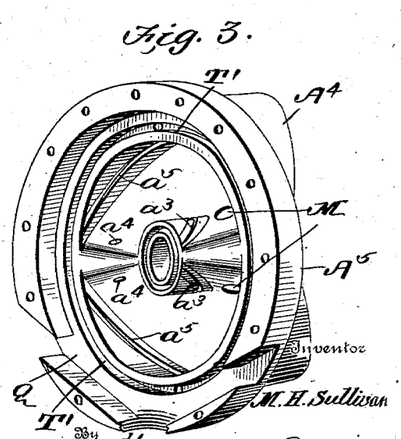
Figure 4:
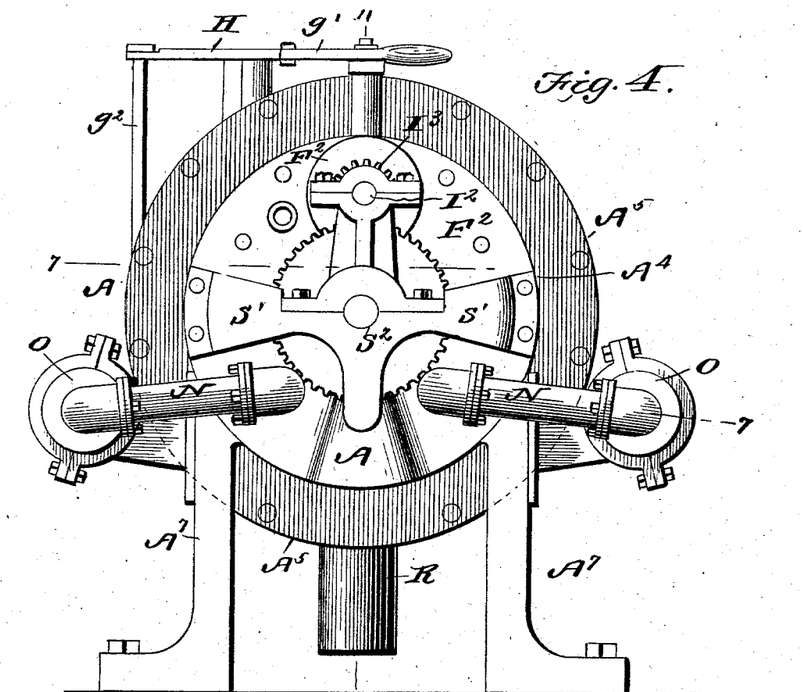
Fig. 4 is an end view of the engine.
Figures 5, 6A:
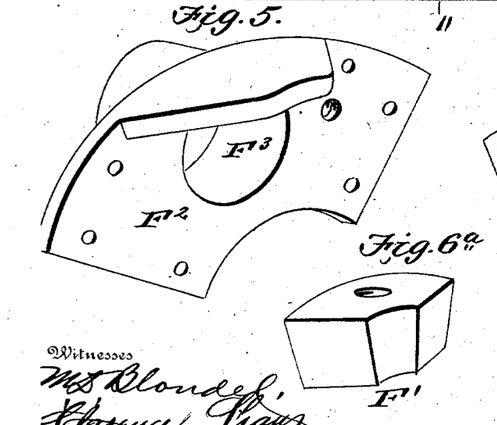
Fig. 5 is a detail view of one of the outer casings which form one of the valve-chambers.
Figure 6:
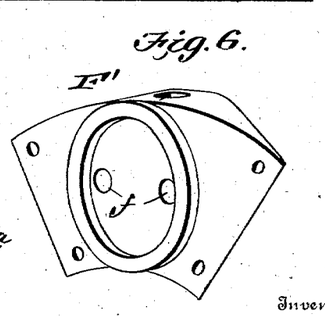
Fig. 6 is a similar view of one of the inner casings.
Figure 7:
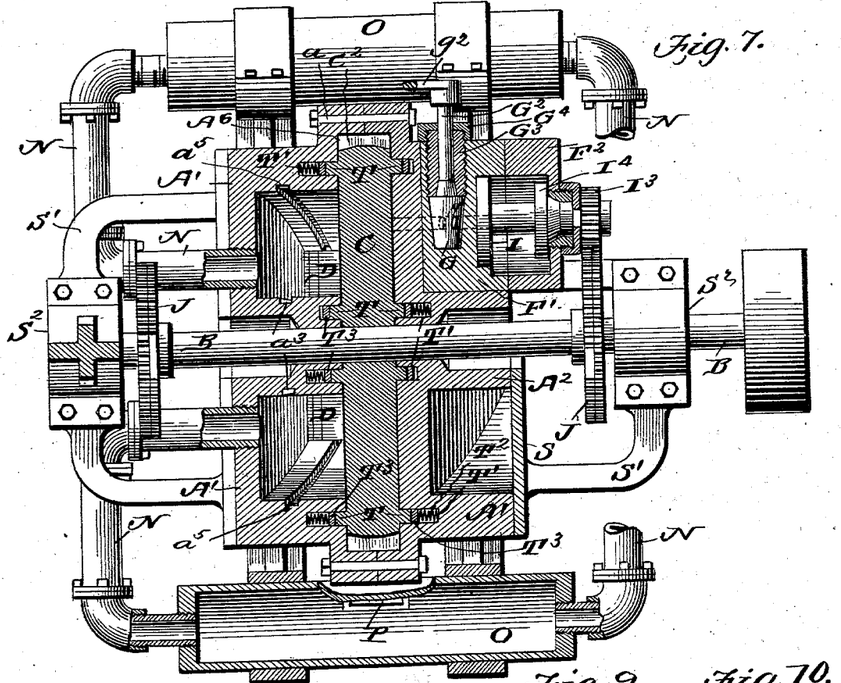
Fig. 7 is an irregular horizontal section taken on the line 7 7 of Fig. 4.
Figure 8:
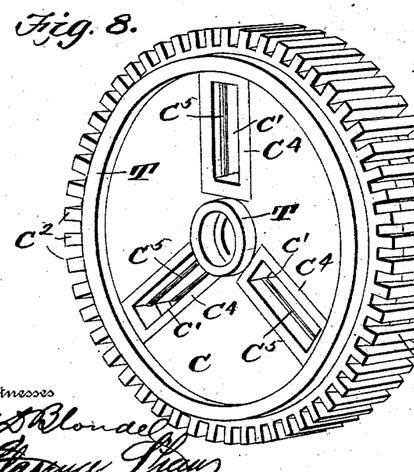
Fig. 8 is a detail in perspective of the centrally-arranged piston-carrying disk.
Figures 9, 10:
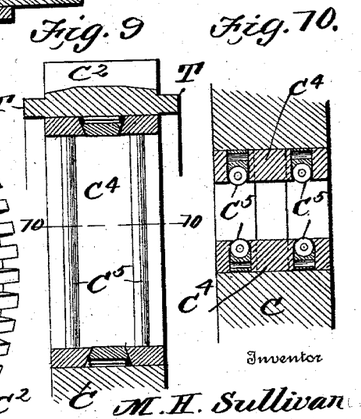
Fig. 9 is a sectional detail view taken centrally through one of the pistons of Fig. 8.
Fig. 10 is a detail sectional view on the line 10 10 of Fig. 9.
Figure 11:
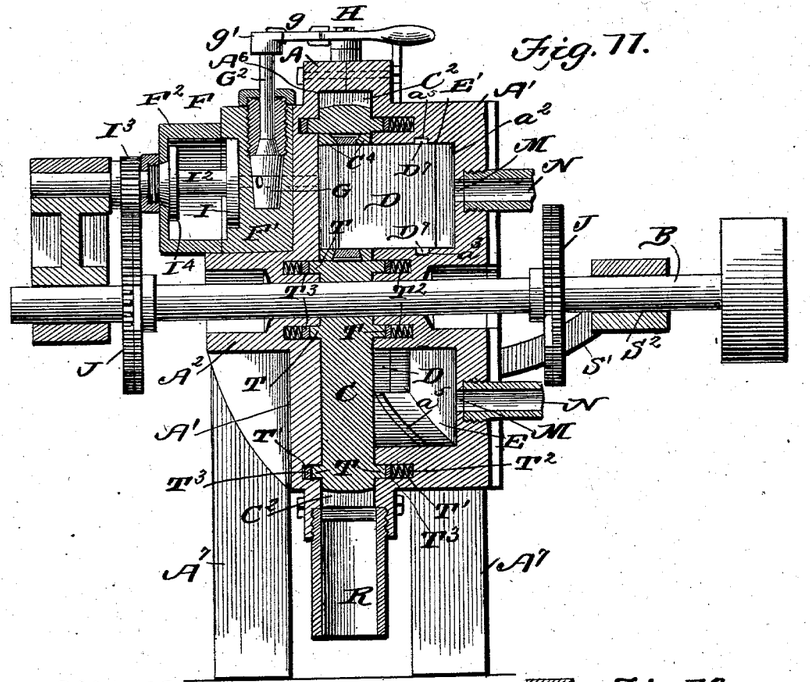
Fig. 11 is a transverse section taken about on the line 11 11 of Fig. 4.
Figure 12:
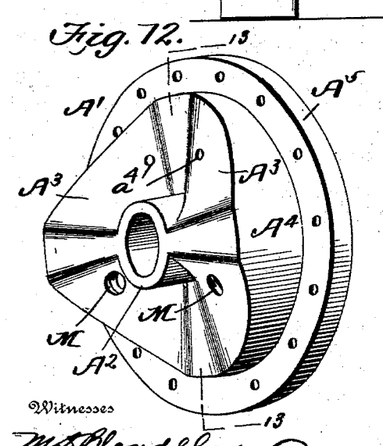
Fig. 12 is a detail perspective view of the exterior of one of the casing-sections.
Figure 13:
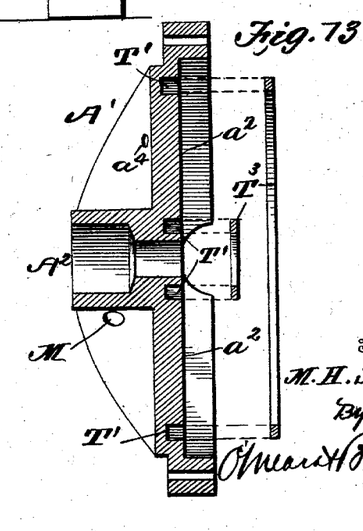
Fig. 13 is a detail section of the same, taken about on the line 13 13 of Fig. 12.
Figure 14:
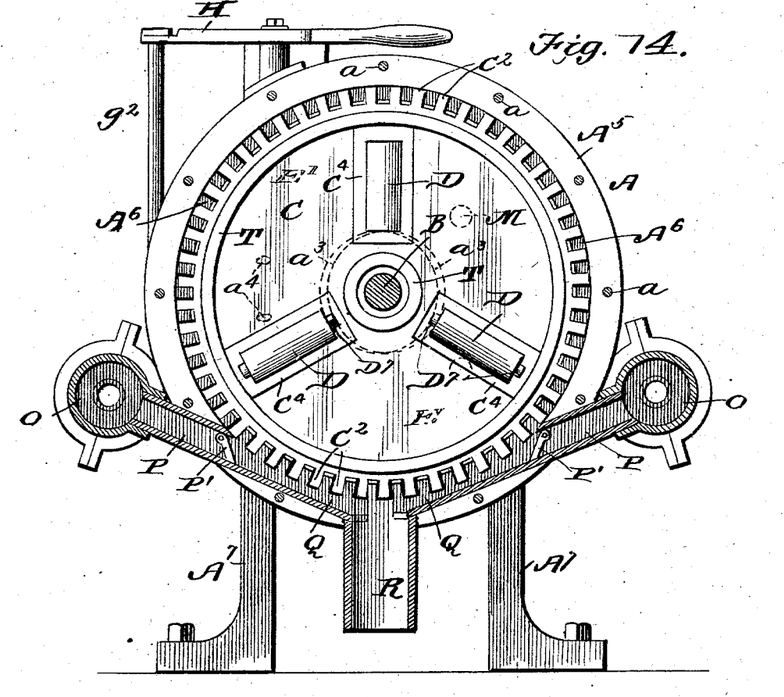
Fig. 14 is a cross-section taken centrally of the casing, the disk and the piston being shown in elevation.
Figures 15, 16:
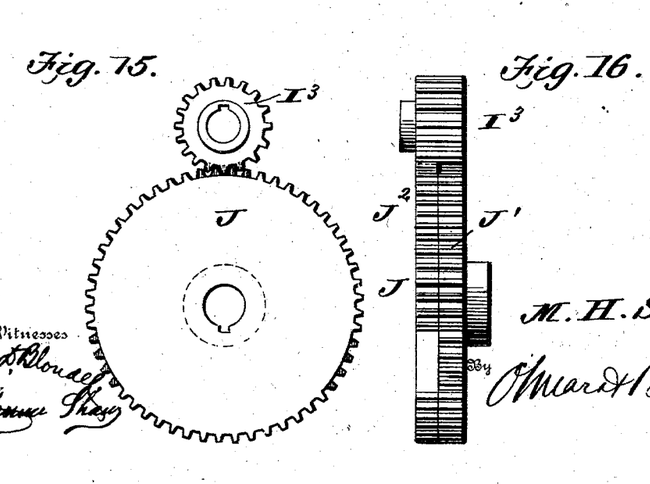
Fig. 15 is a detail face view of one set of driving-gears, the cut-out portion of the teeth of the upper or driven pinion being shaded in dotted lines for the purpose of clearly indicating their location.
Fig. 16 is a detail edge view of the gears.
Figures 20, 21:
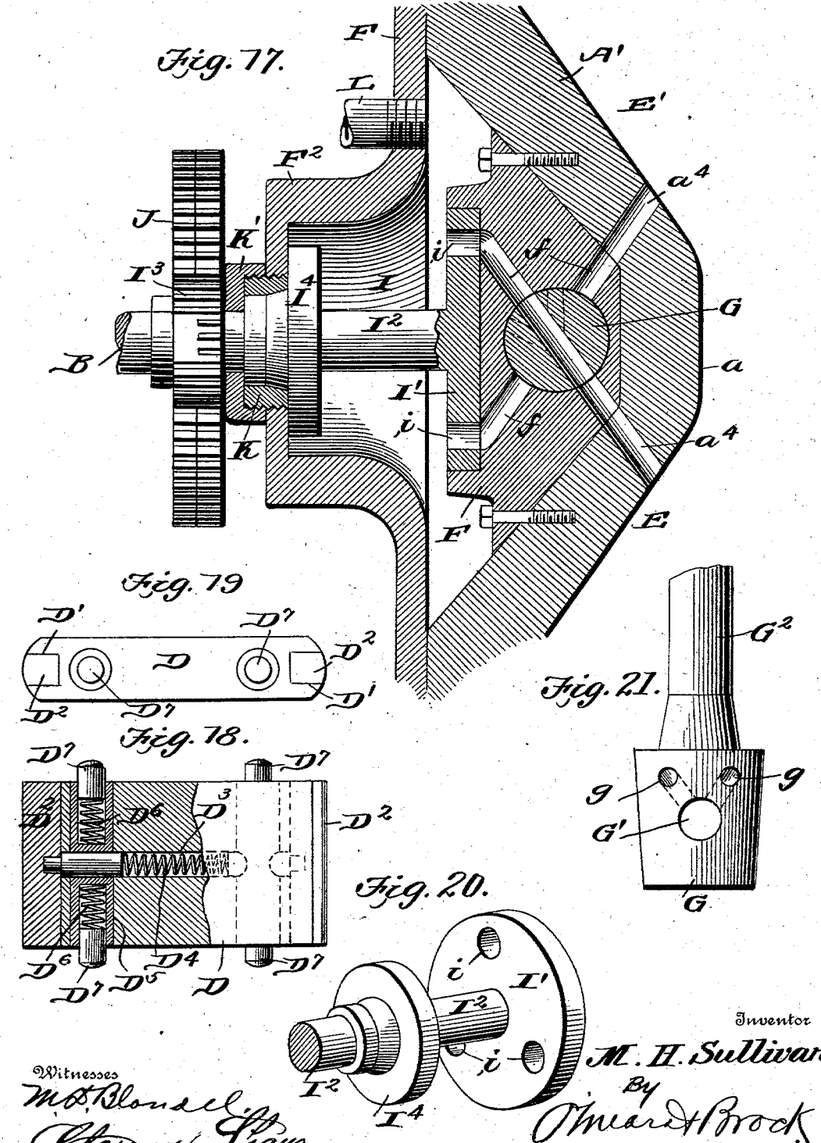
Fig. 20 is a perspective view of one of the rotary valves.
Fig. 21 is a detail view of one of the controlling-valves.

Steam is admitted to the chests F through pipe L, whence it passes through the ports $ff$, valves G, and ports $a^3\ a^3$ into the chambers $E'\ E'$, where the steam engages the pistons, driving them around until they pass the exhaust-ports M in the casing, through which the steam escapes into the pipes N N and into one of the cylinders O, which are mounted on the sides of the casing, and from these cylinders the steam is conveyed through non-circular pipes P into the chamber Q, formed in the abutting flanges $A^3$ of the casing and in which the inner ends of the pipes P are also held, the said inner ends being cut out, as shown in Fig. 14, the extreme ends connecting with the exhaust-pipe R.

During the passage of the steam through either chamber Q it strikes against the toothed surface $C^2$ of the disk C, and thereby furnishes an additional driving power for the wheel after the steam has been first used against the pistons.

Two cylinders O are shown; but it is to be understood that steam is admitted through but one at a time, according to the direction in which the wheel is revolving.

To the ends of the casing are securely bolted plates S, having brackets S' formed therewith, in which bearing-surfaces S² are arranged that are designed to receive and support the outer ends of the driven shaft.

In practice I prefer to provide the disk C with outwardly-projecting annular shoulders T, which fit into recesses T', formed in the casing. Springs T² hold suitable packing material against the shoulders T, and thus prevent escape of steam around the toothed periphery of the wheel.

It will be particularly noted that the irregular surface of the casing acts as abutments dividing the inner portion of the casing into a plurality of steam-tight compartments, that as the disk revolves the pistons pass back and forth through the slots, being actuated by the rollers traveling in the grooves, the grooves so arranged that each piston is passed through the slot once each way during each revolution of the disk. The grooves also are cut so that the movements of the pistons are timed with reference to the opening of the inlet-valves and also so that the contact-surfaces of the pistons are gradually exposed to the action of the steam, being fully exposed by the time the pistons reach the exhaust-ports, and the full force of the then expanded steam as the supply has been previously cut off is allowed to press against the full surface of each piston at the time when the steam has expended its greatest force and a larger bearing-surface is needed.

By experimentation it has been ascertained that better results can be had with three pistons instead of four, as a greater travel of piston is had before exhausting, and that one piston can be held under a full head of steam without creating any back pressure, whereas when four pistons were used there would be a back pressure on the following piston.

It is understood that the rollers on one side or the other of the pistons are always engaged with the grooves prepared for them, said grooves being parallel to the irregular inner cam-face of the casing, the rollers on one end disappearing within the recess of the piston when the rollers on the other side are fully engaged. It is further understood that by using the grooves to give the lateral movement of the pistons the cam-face of the casing is relieved of this duty, and friction is thereby avoided and a practically noiseless engine is produced.

By shifting the hand-lever the engine will be reversed, and for that reason the chambers O are arranged on opposite sides of the casing, and by arranging the valve between the two extreme positions the steam will be cut off from the casing and the engine stopped.

Having thus fully described my invention, what I claim as new, and desire to secure by Letters Patent, is—

1. The combination of a casing having irregular bearing-surfaces in the ends thereof and a chamber arranged centrally therein, of a toothed disk operating in the said chamber, laterally-movable pistons carried by the said disk, the said casing having inlet and exhaust ports arranged therein, and rotary valves controlling the said inlets, means for conducting the steam to the inlets and from the exhausts to the periphery of the disk, substantially as shown and described.

2. In a rotary engine, the combination of a casing having inlet and exhaust ports arranged therein, of a disk operating in the casing, pistons carried by the said disk, steam-chests arranged upon either side of the casing and at right angles to each other, and having ports that register with the inlets of the casing, rotary valves operating in the steam-chests and controlling the ports thereof, and means for automatically operating the said valves, substantially as shown and described.

3. In a rotary engine, the combination of a casing having inlet and exhaust ports arranged therein, of a toothed disk operating in the casing, pistons carried by the disk, chambers arranged adjacent the casing, pipes connecting the exhaust-ports with the chambers, and pipes leading from the said chambers to the periphery of the said toothed disk, and having check-valves arranged therein, substantially as shown and described.

4. In a rotary engine the combination of a casing having inlet and exhaust ports arranged therein, the said casing having its ends formed upon irregular planes, of a toothed disk operating in the casing and forming a series of chambers in the said casing, steam-chests arranged upon the casing and at right angles to each other, controlling-valves arranged in the said chests, rotary valves operating in the said chest, levers connected to the controlling-valves and means for operating the rotary valves, substantially as shown and described.

5. In a rotary engine, the combination of the casing having inlet and exhaust ports arranged therein, a toothed disk carried by the casing, pistons carried by the said disk, valve-chests mounted upon the ends of the casing and having inlet-ports registering with the inlet-ports of the casing, cylinders arranged upon the sides of the casing, pipes connecting the said cylinders with the said exhaust-ports of the casing, pipes leading from the cylinders and having their opposite ends inclosing the periphery of the said toothed disk, check-valves arranged within the pipes, an exhaust-pipe connected to the last-named pipes, substantially as shown and for the purpose specified.

6. In a rotary engine the combination of a casing having a central chamber arranged therein and a series of chambers arranged in the ends thereof, of a disk operating in the casing, pistons carried by the disk and operating in the said chambers in the ends of the casing, the said casing having inlet and exhaust ports communicating with the said end chambers, steam-chests mounted upon the ends of the casing and having ports communicating with the inlets of the casing, a controlling-valve having a main port and auxiliary ports operating in each of the said chests, a rotary valve arranged in the said chest and having openings arranged therein that register with the ports of the said chests and means for operating the said controlling-valves and rotary valves, substantially as shown and described.

7. In a rotary engine the combination of a casing having inlet and exhaust ports arranged therein, of a disk operating in the casing, pistons carried by the disk, steam-chests arranged upon the ends of the casing, and at right angles to each other, the said chests comprising the inner and outer sections, said inner sections having ports arranged therein that communicate with the ports of the casing, a controlling-valve arranged in the said inner sections and ports that communicate with the ports of the said sections, a rotary valve having openings that register with the ports of the said inner sections, and means for operating the said rotary valves, substantially as shown and described.

8. A disk for an engine of the kind described comprising the main portion having openings arranged therein, boxings arranged in the openings, spring-actuated rollers projecting through the boxes, and teeth formed upon the periphery of the disk, substantially as shown and described.

9. A piston for an engine of the kind described, comprising a body portion having its ends recessed and bores projecting therein, caps slidably retained in said recesses, pins carried by the caps and working in the said bores, springs arranged in the bores and bearing against the caps, and rollers carried by the piston, on each side adjacent each end.

10. The combination of a casing having inlet and exhaust ports arranged therein, of a peripheral-toothed disk operating in the casing, transversely-movable pistons carried by the disk, steam-chest, arranged upon the casing and communicating with the inlet-ports, valves controlling said inlet-ports, cylinders communicating with the exhaust-ports and with pipes connected to the cylinder and discharging upon the periphery of the disk, and plug-valves for controlling the passage through the inlet-ports and means for controlling the plug-valves, substantially as described.

11. The combination of a casing formed of sections and each having annular recesses formed in their abutting faces to form a chamber when the sections are united, said sections having a hub portion and irregular ends which connect the hub with the peripheries of the sections and forming a series of chambers, a shaft mounted in the hub, a toothed disk carried by the shaft and extending into the said annular recess, pistons carried by the disk and operating in the last-named chamber, said pistons being adapted to receive the impact of steam, and means for conducting the steam from the last-named chamber, and means for controlling the inlet of steam, substantially as described.

12. In a rotary engine the combination of a casing having an annular chamber arranged centrally therein, and a series of chambers formed in the ends thereof, of a toothed disk operating in the casing between the second-named chambers and extending into the annular chamber, pistons carried by the disk and adapted to operate in the series of chambers, the said casing, having inlet and exhaust ports communicating with the last-named chambers, steam-chest arranged exteriorly upon the casings with which the inlet-ports communicate, valves arranged in the said chests for controlling the said ports, pipes connected to the exhaust-ports, cylinders communicating with the pipes and a second set of pipes connecting the cylinders with the annular chamber, means for controlling the direction of steam to the piston-chambers, and means for operating the valves, substantially as described.

13. In a rotary engine the combination of a casing having a chamber arranged centrally therein, of a shaft mounted in the casing, a toothed disk mounted upon the shaft and extending into the chamber, the said casing having a series of chambers arranged therein and upon opposite sides of the disk, and having inlet and exhaust ports communicating therewith, cylinders arranged upon opposite sides of the casing, pipes connecting the exhausts with the cylinders, steam-chests arranged upon opposite sides of the casing, and having inlet-ports arranged therein, valves arranged within the chests and controlling the entrance to the said ports, plug-valves arranged within the chest at the intersections of the inlet-ports, a pipe connected to each cylinder and communicating with the annular chamber and upon opposite sides of the casing, substantially as described.

14. In a rotary engine the combination of a casing having an annular chamber arranged therein, of a shaft mounted in the casing, of a toothed disk mounted upon the shaft, the casing having a series of chambers arranged upon the opposite sides of the disk, pistons carried by the disk and movable transversely therethrough and into the second-named chambers, the said casing having inlet and exhaust ports, communicating with the piston-chambers, the said inlet-ports communicating with ports in steam-chests, that are arranged upon the casing, said ports intersecting, a plug-valve arranged within the chest at the point of intersection of the ports, said valve having a main and auxiliary port formed therein, valves operating in the chests and controlling the inlets, and means for operating the plug-valves and means for operating the valves in the steam-chests, substantially as described.

15. In a rotary engine the combination of a casing having its ends arranged upon irregular planes, and an annular chamber formed centrally in the casing, a shaft mounted in the casing, a disk mounted thereon and operating in the casing and forming a series of chambers in the ends of the casing, steam-chests arranged upon opposite ends of the casing and at right angles to each other, the said casing having inlet and exhaust ports arranged therein, said inlet-ports communicating with the piston-chambers, and the steam-chests, valves arranged within the chests and having stems projecting therethrough, a mutilated pinion carried by each stem, mutilated gears carried by the said shaft and meshing with the pinion, cylinders arranged upon opposite sides of the casing, pipes connecting the exhaust-ports with the cylinders, pipes connecting the cylinders at one end and having their opposite ends extending into the annular chamber in the casing, said pipes having their inner ends arranged to straddle the periphery of the disk and check-valves arranged in the last-named pipes and means for controlling the inlet of steam into the said piston-chambers substantially as described.

16. A casing for rotary engine, substantially as described, composed of sections, each section comprising the hub and periphery portions, and the ends which are arranged upon the irregular planes, flanges formed upon the hub and periphery portions, inlet and exhaust ports formed in each section, chambers formed in the periphery of each section, and extending in opposite directions from a central exhaust-port, substantially as shown.

17. In a rotary engine the combination of a casing, shaft mounted therein, a disk carried by the shaft and disposed centrally within the casing, pistons carried by the disk, steam-chests mounted upon the casing, a rotary valve arranged within each chest, said valves each having a port which is brought in register with inlet-ports in the casing, a mutilated pinion mounted upon each valve-shaft, a mutilated gear carried by the main shaft and adapted for engagement with the said pinion, substantially as described.

18. In a rotary engine, the combination of a casing formed of sections and having a centrally-arranged chamber formed therein, and the sides of said casing formed in irregular bearing-surfaces, a shaft mounted in the casing, a toothed disk carried by the shaft, said disk extending into the said chamber, laterally-movable pistons carried by the disk, the said casing having inlet and exhaust ports arranged therein, cylinders arranged upon the casing, pipes connecting the exhaust ports and cylinders, steam-chest arranged over the inlet-ports, valves carried by the said chest, and means carried by the disk-shaft for operating the said valves and pipes connected to the cylinders and discharging against the teeth of the disk, substantially as and for the purpose set forth.

19. The combination with a casing, a disk operating therein, said disk having apertures formed therein, spring-actuated antifriction-rollers arranged within the apertures, pistons operating in the apertures, spring-actuated bearing-blocks carried by the pistons, substantially as described.

20. The combination with a casing having cam-faced ends, said casing having grooves running parallel to the cam-faces, of a disk rotatable therein, said disk being laterally slotted, pistons adapted to slide through the slotted portions of the disk, and rollers on the pistons engaging the grooves.

MICHAEL H. SULLIVAN.

Witnesses:
JOHN T. NEVINS,
MARGARET E. MYLOD.